Nov. 15, 1966 P. J. V. NEGRE 3,284,879

PROCESS FOR ENSURING NON-CORROSIVE CONTACTS ON HEATING RODS

Filed April 8, 1960

2
1
3

INVENTOR
Pierre Jean Victor Negre
By
Watson, Cole, Grindle & Watson
ATTORNEYS

United States Patent Office 3,284,879

Patented Nov. 15, 1966

3,284,879

PROCESS FOR ENSURING NON-CORROSIVE CONTACTS ON HEATING RODS

Pierre Jean Victor Negre, Paris, France, assignor to Societe Nationale d'Etude et de Construction de Moteurs d'Aviation, Paris, France, a company of France Filed Apr. 8, 1960, Ser. No. 21,031

Claims priority, application France, Apr. 10, 1959, 791,725

7 Claims. (Cl. 29—155.71)

The present invention relates to a method permitting of the permanent establishment of a good electrical contact between a refractory material brought to high temperature such as a heating rod and the electrical current connection elements to which this material is connected.

Such a problem arises especially in industry for effecting the heating of a furnace by means of bars of refractory material brought to red heat by a suitable electric current. The connections are effected by a non-deteriorratable metallic wire wound at each end. This assembly is satisfactory in some cases since the ends of the bars are outside the walls of the furnace and can be cooled by a forced air flow.

However this assembly is not suitable in other cases, especially for the ignition of aeronautical propulsion units, for the following reasons:

(1) It is practically impossible to effect an efficient cooling of the refractory bar or bars used for ignition, by reason of the small available space, the necessity of ensuring tightness of the enclosure under pressure where the ignition takes place, and finally of the inherent complication, which is not acceptable in aero-engines.

(2) The small diameter of the refractory rods renders the installation of complicated connection and cooling devices excessively difficult.

(3) The spark plug, including contacts, is situated inside the enclosure of the combustion chamber.

(4) The very high temperature required of the rods subjects them and their mechanical conductive supports to very high thermal stresses. They involve mechanical deformations which are variable according to the materials present (dilation hysteresis) and chemical modifications (formation of insulating oxides on the contacting surfaces).

(5) The total time of action of the spark plug in comparison with its life duration on the motor is very short. Thus it is not possible for a definitive operational equilibrium to be established (incidentally incompatible with the preservation of the rods).

(6) This total action time is also divided up into a multitude of ignition actions. This causes by use of the above-mentioned dilations and oxide formations harm to the electrical contacts.

The process according to the present invention permits a durable electrical contact between the refractory material intended to be brought to high temperature, and the electric current input and output elements to which this material is connected.

In accordance with the present invention, between the refractory material and the connection elements there is disposed a paste constituted by a mixture of a fatty substance and a solvent, with a powder of an electrically conductive metal having a fusion point appreciably lower than that of the material constituting the connection elements, and the assembly thus constituted is heated. In this manner, after cooling, the connection elements adhere perfectly to the refractory material, thus ensuring a stable electrical contact.

The invention is illustrated by way of example in the accompanying drawings in which.

Figures 1, 2:
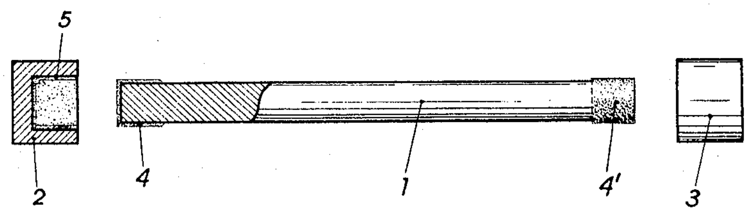
FIGURE 1 shows a refractory rod, the ends of which are intended to receive metallic tips, one of the tips and a part of the rod being represented in axial section.
FIGURE 2 shows, with partial section, the rod, whose ends are placed in the tips.

In FIGURE 1 there is shown a cylindrical rod 1 of refractory material having a certain electrical resistivity, as for example silicon carbide, and intended, when brought to high temperature by the passage of a current, to effect the ignition of a combustible mixture, especially in an aeronautical propulsion unit.

Metallic tips 2 and 3 are intended to be placed at the ends of the rod, and to serve as connections for the input and output of the electrical current. These tips are ismple cylindrical hollow bodies with relatively thick walls constituted by a refractory material not oxidisable by heat, for example a steel which satisfies these conditions. The blind bore of each tip has a diameter about 10% greater for example than that of the rod.

In order to effect a durable electrical contact between the heating rod 1 and the metallic tips 2 and 3, the following procedure is adopted:

A very fine powder is prepared of a conductive metal having a melting point appreciably lower than that of the material constituting the tips. For this purpose aluminum powder may be selected.

This powder is mixed intimately with a fatty substance, neutralized if necessary, for example tallow, glycerine, dammar gum, etc., and a solvent such as ordinary petrol, oil of turpentine or a substitute product known under the name of white spirit, etc., until a consistency similar to that of fresh putty is obtained.

The powder having thus been agglomerated plastically by a binder, the two ends of the rod 1 are coated with this paste, as shown at 4 and 4' in FIGURE 1. Some of this paste is also put into the bores of the metallic tips, as shown at 5 in the drawing.

The tips 2 and 3 are then mounted on the rod 1 (FIGURE 2). The excess paste is removed and the whole is fixed on a mounting permitting the passage of a rapidly but progressively increasing electric current. The rod is finally brought to incandescence by Joule effect.

Under the action of the heat, the metal of the paste melts, while certain of the ingredients which have served for the preparation of the paste vaporize or commence reaction. When the fumes have cleared, the operation is terminated. After cooling, the rod 1 and its tips 2 and 3 adhere perfectly to one another, the pressure phenomena due to the expansion during heating and the contraction on cooling contribute to the solidity of the assembly.

The elements thus prepared can then be mounted in the spark plug. The electrical contact between the rod and the tips, effected according to the process which has just been described, proves stable and has an endurance ensuring great ignition reliability.

The following composition, indicated by way of non-limitative example, has given very satisfactory results:

| | Percent |
|---|---|
| Powdered aluminum | 97 |
| Dammar gum | 2 |
| Oil of turpentine | 1 |

This binder is flexible enough to compensate for the possible expansions; on the other hand it prevents contact with air, responsible for the formation of insulating oxides.

The heating of the assembly causing the solidification of the paste with the tips and the rod could be effected by the use of any other source of heat than that produced by Joule effect. For example the assembly could be heated in an oven, or a blow-pipe.

I claim:

1. A process permitting of ensuring a durable electrical contact between a refractory material intended to be brought to high temperature and electrical current input and output elements, to which this material is connected, the said process consisting in disposing between the refractory material and the connection elements a paste constituted by a mixture of a fatty substance and a solvent with a powder of an electrically conductive metal having a melting point appreciably lower than that of the material constituting the connection elements, and then heating the assembly thus constituted above a temperature higher than the melting point of said metal wherein the paste is constituted by 97% aluminum powder, 2% of dammar gum and 1% of turpentine oil.

2. A process according to claim 1, in which the heating is effected in a rapidly but progressively increasing manner.

3. A process according to claim 1, in which the refractory material is a rod the ends of which fit into connection elements constituted by cylindrical metallic tips having a blind bore with a diameter substantially greater than that of the rod.

4. A process according to claim 3, in which the ends of the rod are coated with paste, as are the bores of the connection elements, before the ends of the refractory material are introduced into the metallic tips.

5. A process permitting of ensuring a durable electrical contact between a member made of silicon carbide intended to be brought to high temperature and electrical current connection elements made of a steel not oxidisable by heat, the said process consisting in disposing between said member and said elements a paste constituted by a mixture of a fatty substance and a solvent with aluminum powder, and heating the assembly thus constituted to a temperature above the melting point of aluminum wherein the paste is constituted by 97% aluminum powder, 2% of dammar gum and 1% of turpentine oil.

6. A process according to claim 5, in which said member is a rod and said connection elements are cylindrical metallic tips having a blind bore with a diameter substantially greater than that of said rod and into which fit the two ends of said rod respectively.

7. A process for ensuring a durable non-corrosive contact between a heating rod member made of an electrically conductive and refractory material of the class including silican carbide and electrical current connection elements affixed thereto, said process comprising the steps of fashioning said connection elements of a refractory metal not substantially oxidizable at the temperatures encountered during processing and use selected from a class including certain grades of steel, fashioning said connection elements as cylindrical metallic tips having a blind bore with a diameter greater than that of the rod and into which fits the two ends of the rod, disposing between the member and said elements a paste constituted by a mixture of a fatty substance and a solvent with a powder of an electrically conductive metal having a melting point appreciably lower than that of the refracting metal selected from a class including aluminum, and rapidly and progressively increasing passage of electric current through said connection elements to bring said rod to incandescence by the Joule effect at a temperature exceeding the melting point of said conductive metal and below the corrosion point of said refractory metal whereby a connection is made free of the formation of insulating oxides on the contracting surfaces.

References Cited by the Examiner

UNITED STATES PATENTS

| | | | |
|---|---|---|---|
| 804,664 | 11/1905 | Leisel | 148—25 X |
| 868,498 | 10/1907 | Smith et al. | 148—25 X |
| 1,335,024 | 3/1920 | Peschko. | |
| 1,724,465 | 8/1929 | Engels | 29—473.1 X |
| 1,778,665 | 10/1930 | Egly | 29—155.71 X |
| 1,787,749 | 1/1931 | Heyroth | 29—155.71 |
| 1,814,583 | 7/1931 | Benner et al. | 29—155.71 X |
| 1,860,275 | 5/1932 | Chapin | 29—496 X |
| 1,906,963 | 5/1933 | Heyroth | 338—330 |
| 2,001,297 | 5/1935 | Boyles | 29—155.71 X |
| 2,015,482 | 9/1935 | Lilenfeld | 29—472.9 X |
| 2,037,951 | 4/1936 | Thomson | 29—155.71 |
| 2,093,390 | 9/1937 | Wyckoff. | |
| 2,198,578 | 4/1940 | Hazelton et al. | 29—472.7 X |
| 2,219,365 | 10/1940 | Janssen | 29—155.71 |
| 2,395,442 | 2/1946 | Ballard | 29—472.7 X |
| 2,899,666 | 8/1959 | Drugmand et al. | 338—329 |
| 2,935,718 | 5/1960 | Frost | 338—329 |
| 2,958,932 | 11/1960 | Goercke | 29—155.71 |
| 2,960,757 | 11/1960 | Epstein | 29—155.71 |
| 2,993,111 | 7/1961 | Schrewelius et al. | 29—472.9 X |

FOREIGN PATENTS

| | | |
|---|---|---|
| 466,049 | 5/1937 | Great Britain |

CHARLIE T. MOON, *Primary Examiner.*

RAY K. WINDHAM, ROGER L. CAMPBELL, H. T. POWELL, P. M. COHEN, *Assistant Examiners.*